United States Patent [19]

Rogers

[11] 4,240,175
[45] Dec. 23, 1980

[54] APPARATUS FOR WASHING THE INTERIOR OF A FREIGHT CONTAINER

[75] Inventor: William A. Rogers, Portland, Oreg.

[73] Assignee: Roberts Harvester, Inc., Portland, Oreg.

[21] Appl. No.: 955,464

[22] Filed: Oct. 27, 1978

[51] Int. Cl.³ .......................... B08B 3/02; B08B 9/00
[52] U.S. Cl. ...................................... 15/21 E; 15/56; 134/45
[58] Field of Search ............ 15/21 E, 53 A, 56, 49 C, 15/50 C, 82, 79 A; 134/46, 45

[56] References Cited

U.S. PATENT DOCUMENTS

| 2,941,223 | 6/1960 | Klauer ................................. 15/82 X |
| 3,461,889 | 8/1969 | Saxonmeyer . | |
| 3,534,746 | 10/1970 | Posner ................................... 134/46 |
| 3,830,430 | 8/1974 | Hartunian ........................ 15/21 E X |
| 3,961,983 | 6/1976 | Crandall et al. .................. 15/21 E X |
| 4,106,516 | 8/1978 | Wiegand ................................ 134/45 |
| 4,112,533 | 9/1978 | Brager ................................. 15/53 A |
| 4,141,374 | 2/1979 | McMahan ............................. 134/46 |

FOREIGN PATENT DOCUMENTS 147051  6/1952  Australia ................................. 15/79 A Primary Examiner—Edward L. Roberts
Attorney, Agent, or Firm—Klarquist, Sparkman, Campbell, Leigh, Hall & Whinston

[57] ABSTRACT

The specification discloses an apparatus for washing the interior of an elongate, generally rectangular freight container. The apparatus includes a wash dolly and a transfer carriage adapted to carry the wash dolly into alignment with the open end of the container. A control system including electrical and hydraulic circuits causes the wash dolly to travel off of the transfer carriage, along substantially the entire length of the container, and back onto the transfer carriage. The wash dolly scrubs and sprays the interior of the container as it travels.

6 Claims, 11 Drawing Figures

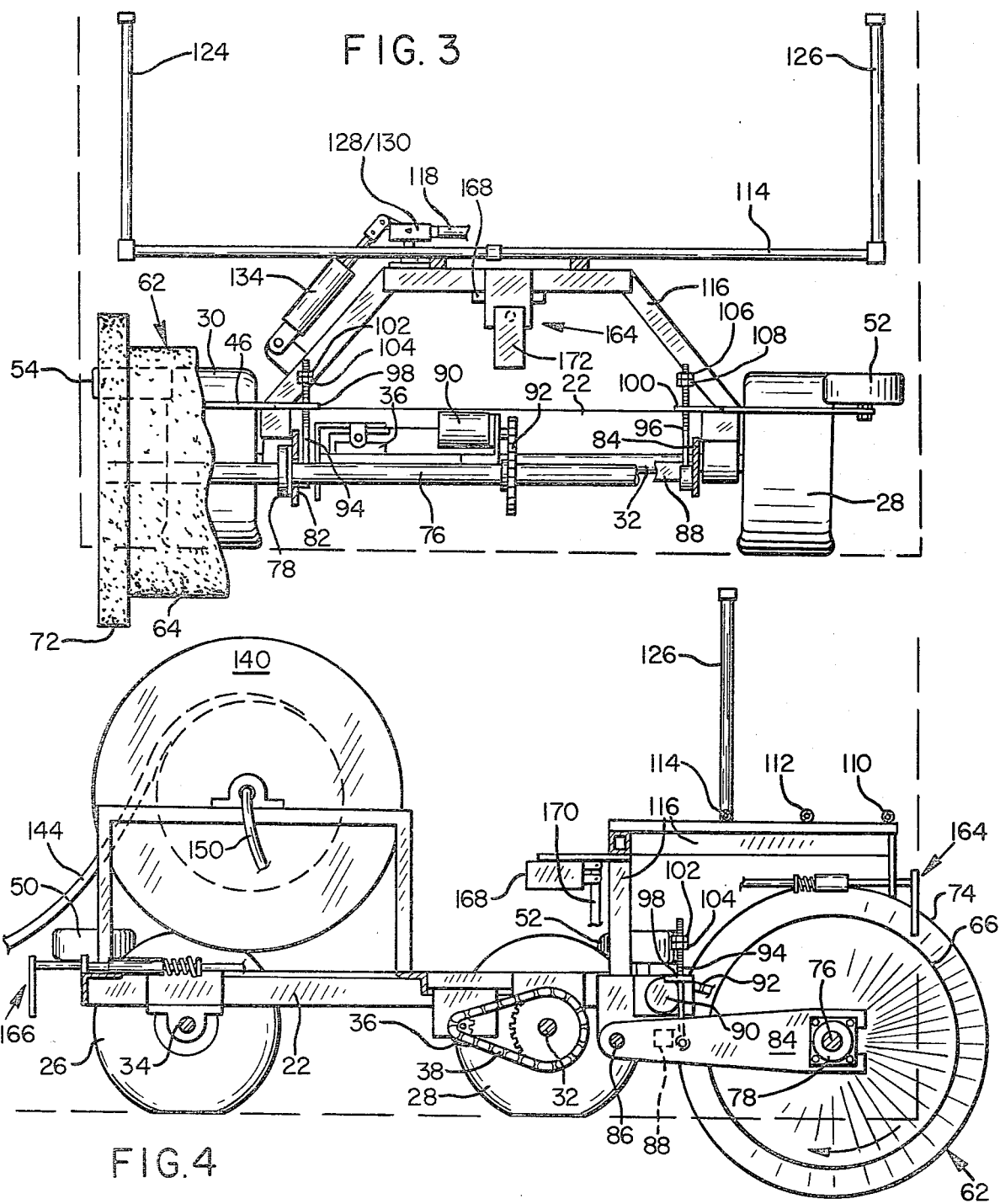
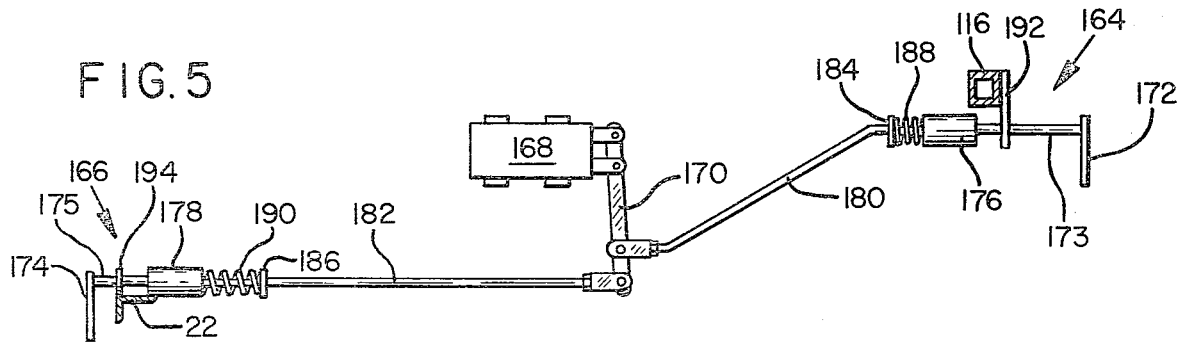

APPARATUS FOR WASHING THE INTERIOR OF A FREIGHT CONTAINER

BACKGROUND OF THE INVENTION

The present invention relates to automated washing apparatus, and more particularly to an apparatus for washing the interior of an elongate, generally rectangular freight container such as a truck trailer. Relatively large freight containers used in a wide variety of commercial enterprises must be kept clean primarily for sanitation reasons. For example, truck trailers, railroad cars, and shipboard cargo containers used to transport perishable freight such as meat and vegetables must be regularly washed to remove debris and reduce the bacteria count to negligible levels. Otherwise the perishable freight is more likely to become spoiled or contaminated.

Heretofore such freight containers have generally been manually washed, often by two or more persons using brooms and hoses. This process, is expensive, time consuming and tedious. In addition, it is often difficult for even the most conscientious persons to do a thorough, adequate job on a consistent basis. U.S. Department of Agriculture sanitation standards governing such freight containers are becoming more and more stringent and it is therefore desirable to have an apparatus capable of quickly and thoroughly washing these containers.

One apparatus has been developed for washing the interior of a truck trailer. It includes a wheeled wash dolly that is powered into and out of the truck trailer by a telescoping boom which extends from a fixed station. This apparatus has not operated satisfactorily.

SUMMARY OF THE INVENTION

An object of the present invention is to provide an apparatus for washing the interior of a relatively large freight container.

Another object of the present invention is to provide an apparatus which will automatically wash the interior of a truck trailer.

Another object of the present invention is to provide an apparatus for washing the interior of a relatively large freight container which can be readily moved to a plurality of different wash stations.

A further object of the present invention is to provide a wash dolly which can automatically travel into, along substantially the entire length of and back out of the interior of an elongate freight container and which is particularly suited for scrubbing and spraying the interior thereof.

Yet another object of the present invention is to provide a transfer carriage for carrying a wash dolly to a freight container, for guiding the wash dolly between the transfer carriage and the interior of the freight container, and for supplying the wash dolly with cleansing liquid and power.

The present invention provides an apparatus for washing the interior of an elongate, generally rectangular freight container. The apparatus includes a wash dolly adapted to travel into and out of the container and wash the container while so traveling. The apparatus further includes a transfer carriage adapted to carry the wash dolly into alignment with the container and guide the wash dolly between the transfer carriage and the interior of the container.

BRIEF DESCRIPTION OF THE DRAWINGS

FIG. 3 is a fragmentary end elevational view of the wash dolly of FIG. 2 taken along line 3—3 of FIG. 2;

FIG. 4 is a sectional view of the wash dolly of FIG. 2 taken along line 4—4 of FIG. 2;

FIG. 5 is a side elevational view of the sensing mechanism of the wash dolly of FIG. 2;

DESCRIPTION OF THE PREFERRED EMBODIMENTS

Embodiment of FIGS. 1-9

Figure 1:
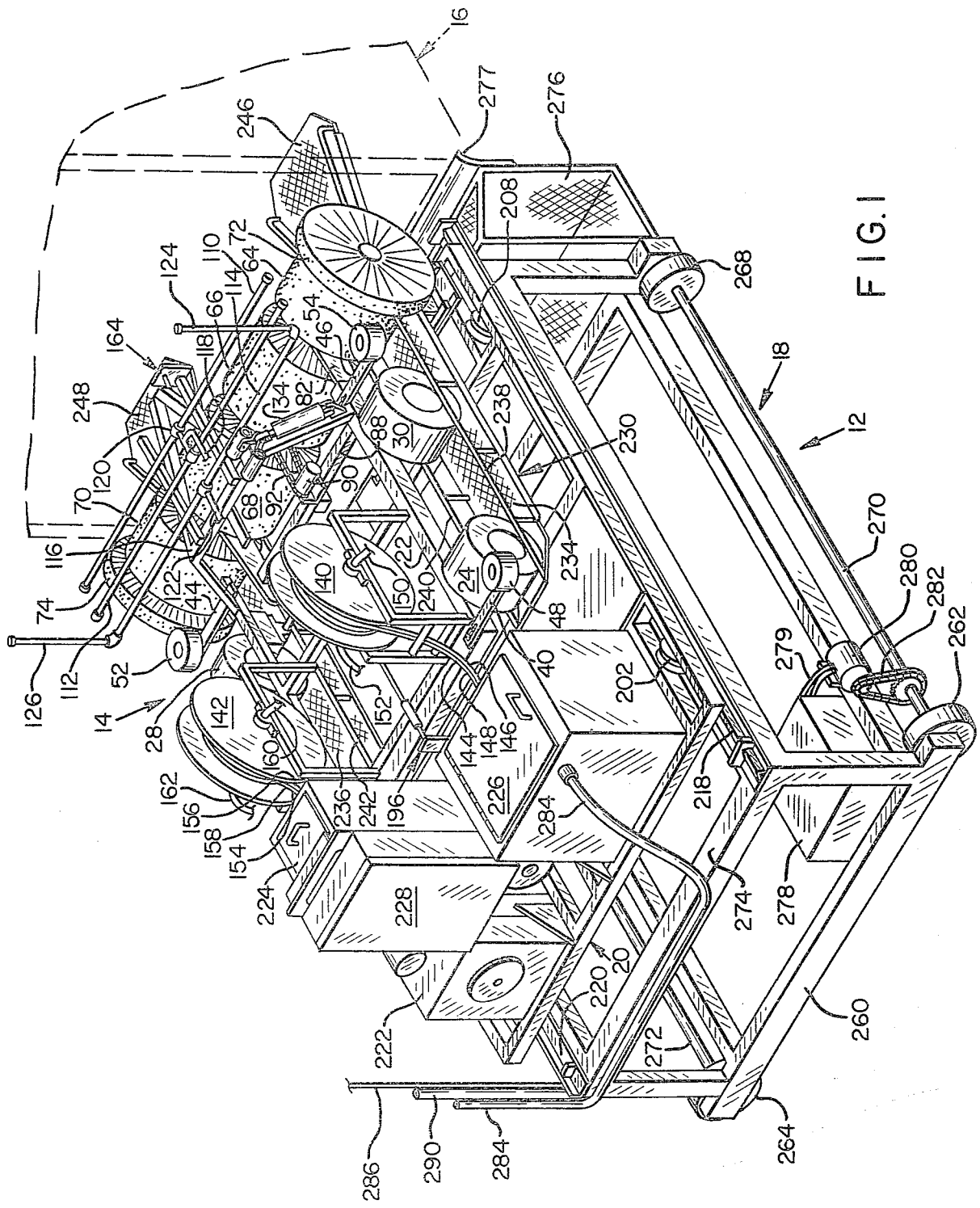
FIG. 1 is a perspective view of an apparatus forming one embodiment of the present invention showing a wash dolly on a transfer carriage which is positioned adjacent the open end of a freight container depicted in phantom lines.

Referring now in detail to the drawings, FIG. 1 shows an apparatus forming one embodiment of the present invention. The apparatus includes a transfer carriage 12 adapted to carry a wash dolly 14. During the washing operation, the wash dolly is propelled off of the transfer carriage and into the interior of an elongate, generally rectangular freight container 16 (shown in phantom lines). The wash dolly is propelled back onto the transfer carriage at the conclusion of the washing operation. The transfer carriage includes a mobile platform 18 and a supply wagon 20 which rolls back and forth on top of the mobile platform. The supply wagon and the wash dolly are carried into alignment with the open end of the container by the mobile platform. The supply wagon guides the wash dolly between the transfer carriage and the container and supplies the wash dolly with cleansing liquid and power.

Figure 2:
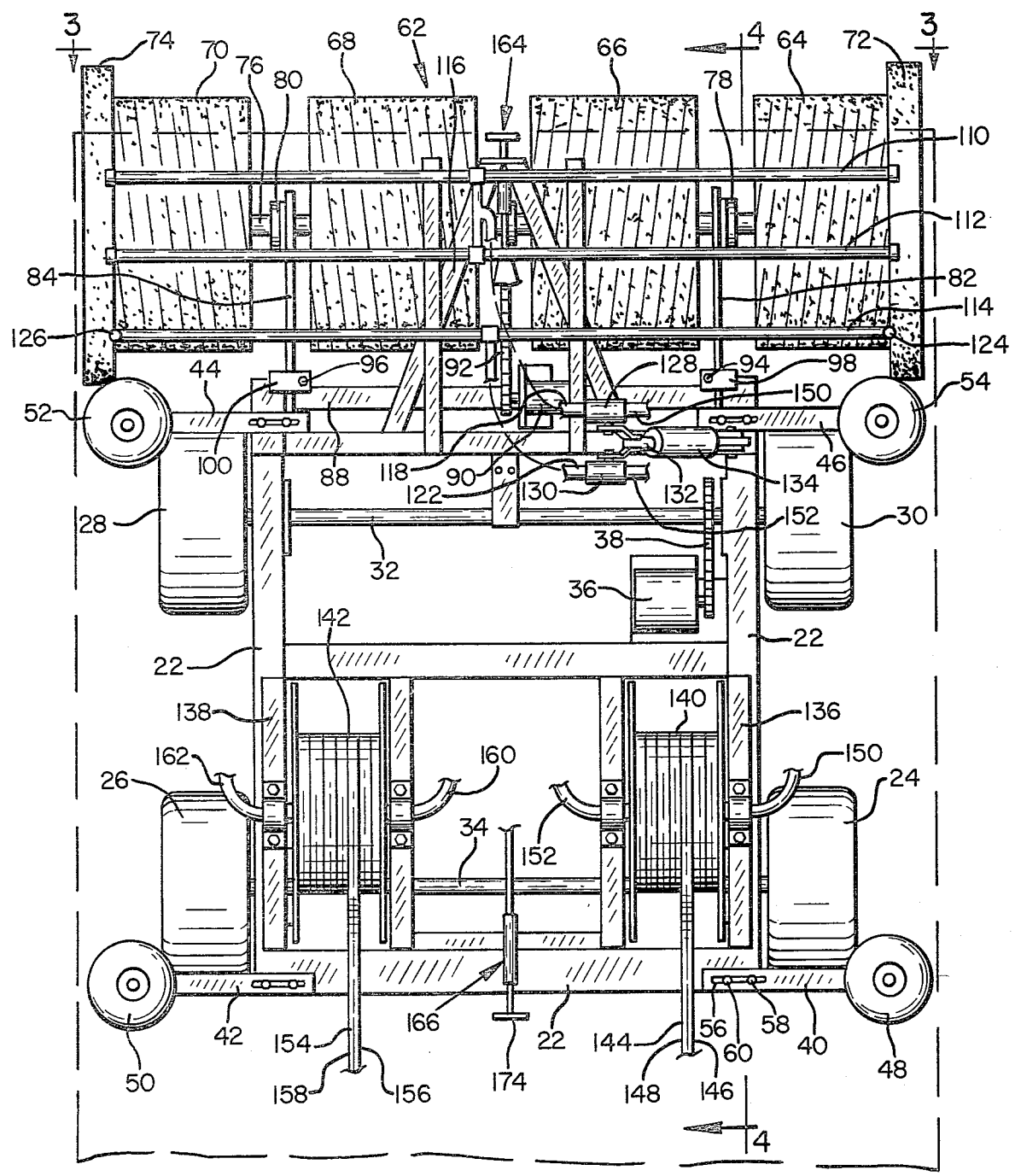
FIG. 2 is a top plan view of the wash dolly of the apparatus of FIG. 1.

The details of the structure of the wash dolly of the apparatus of FIG. 1 are shown in FIGS. 2-5. Referring to FIG. 2, the wash dolly includes a chassis 22 having support wheels 24, 26, 28 and 30 and a pair of parallel axles 32 and 34 for rotatably mounting the support wheels to the chassis. A first hydraulic motor 36 is mounted on the chassis 22 and is drivingly interconnected with the axle 32 by a first sprocket and chain assembly 38.

Arms 40, 42, 44 and 46 mounted on the sides of the chassis 22 support guide wheels 48, 50, 52 and 54, respectively. The guide wheels are positioned so that they can engage the sides of the container to maintain the chassis 22 and the support wheels 24, 26, 28 and 30 in proper orientation for longitudinal travel along substantially the entire length of the container. The distance between the guide wheels 48 and 50 and between the guide wheels 52 and 54 can be adjusted to accommodate freight containers of varying widths. Each arm, for example the arm 40, has an elongate hole therethrough such as 56 for receiving a pair of bolt assemblies such as 58 and 60 which secure the arm the the chassis 22. The extension of the arm 40 relative to the chassis may be varied by loosening the bolt assemblies 58 and 60, sliding the arm inwardly or outwardly, and then retightening the bolt assemblies.

A transversely extending, generally cylindrical brush 62 is rotatably mounted to the forward end of the chassis 22 of the wash dolly. The brush 62 extends the majority of the width of the container. It includes inner brush sections 64, 66, 68 and 70 and a pair of outer brush sections 72 and 74. The diameter of the outer brush sections 72 and 74 is greater than that of the inner brush sections 64, 66, 68 and 70. When the brush 62 is scrubbing the bottom of the container the outer brush sections 72 and 74 deform outwardly. The inner brush sections 64 and 66 have a spiral configuration which is the reverse of the spiral configuration of the inner brush sections 68 and 70. This permits them to sweep liquid and debris toward the center of the container.

The brush sections are mounted in side by side relationship on an axle 76 which is journaled in bearings 78 and 80 mounted on the remote ends of pivot arms 82 and 84 respectively. The other ends of the pivot arms 82 and 84 are hingedly attached to the chassis 22 by pin assemblies such as 86 (See FIG. 4) and are rigidly coupled to each other by a transversely extending beam 88. A second hydraulic motor 90 is mounted on the beam 88 and is drivingly interconnected with the axle 76 by a second sprocket and chain assembly 92.

As shown in FIGS. 2, 3 and 4, the lower ends of a pair of threaded adjustment rods 94 and 96 are pivotably connected to the pivot arms 82 and 84 respectively. The upper portions of the adjustment rods 94 and 96 slidably extend through apertures in plates 98 and 100 respectively secured to the chassis 22 and extend through washers (not shown) which rest on top of the plates. Upper and lower nuts 102 and 104 on the adjustment rod 94 and upper and lower nuts 106 and 108 on the adjustment rod 96 are tightened against each other at preselected locations along the lengths of the rods. The nuts 102, 104, 106, and 108 cannot slide past the washers and the plates 98 and 100. They limit the downward sliding of the rods 94 and 96 and the downward movement of the brush 62.

Because the brush 62 is pivotably mounted to the forward end of the wash dolly it can "float", i.e. move freely upwardly and downwardly. As the wash dolly travels off of the transfer carriage it is inclined so that the forward end of the chassis 22 is below the rearward end of the chassis. The brush 62 contacts the bottom of the container and gradually swings upwardly as the wash dolly continues to travel off of the transfer carriage. If the brush 62 could not swing upwardly it would overbite, that is it would be compressed against the bottom of the container by a portion of the overall weight of the wash dolly. The brush could then gain sufficient traction so that it would propel the wash dolly and would not perform its scrubbing function.

The bristles of the brush 62 are relatively flexible and will deform to allow the brush to swing downwardly under its own weight until the nuts 104 and 108 contact the washers resting on top of the plates 98 and 100. The nuts 102, 104, 106 and 108 may be adjusted to vary the height of the rotational axis of the brush 62. The axis may be lowered so that the scrubbing force of the brush 62 is increased or so that the outer brush sections 72 and 74 will deform further outwardly to accommodate a container of greater width. It may also be lowered to compensate for brush wear.

During the washing operation, the brush 62 is rotated so that the portions of the brush scrubbing the bottom of the container move toward the open end of the container (clockwise in FIG. 4) and push debris and liquid in the same direction. The oppositely spiraled sides of the brush 62 urge liquid and debris on the bottom of the container toward a line extending longitudinally along the bottom of the container midway between its sides. The brush 62 will effectively sweep debris and liquid out of the open end of the container as the wash dolly returns to the transfer carriage. The outer brush sections 72 and 74 deform outwardly so as to contact the junctions between the sides and the bottom of the container, thereby ensuring thorough cleaning.

Transversely extending spray pipes 110, 112 and 114, each having a series of transversely spaced apertures (not shown in the drawings) forming nozzles are mounted on A-frame 116 and discharge liquid adjacent the brush 62. The spray pipes 110 and 112 are coupled to a soapy water hose 118 by a T shaped connector 120 (See FIG. 1). The spray pipe 114 is coupled to a rinse water hose 122. Referring to FIG. 3, the spray pipe 114 has a pair of vertically extending portions 124 and 126, each having a series of vertically spaced apertures (not shown in the drawings) forming nozzles. The spray pipe portions 124 and 126 discharge rinse water onto the sides of the container.

Referring to FIG. 2, the other ends of the hoses 118 and 122 are coupled to the one sides of a pair of on-off valves 128 and 130 respectively. The actuating levers of these valves are operatively coupled to the piston arm 132 of a hydraulic cylinder 134 mounted on the A-frame 116. When the piston arm 132 is fully extended, the valve 128 is closed and the valve 130 is open. When the piston arm 132 is fully retracted, the valve 18 is open and the valve 130 is closed.

Referring to FIGS. 1 and 2, a pair of stands 136 and 138 mounted on the rearward portion of the chassis 22 of the wash dolly support rotatable reels 140 and 142. A flexible double water hose 144 consisting of two separate supply hoses 146 and 148 joined side by side, is coiled about the reel 140. The innermost ends of the supply hoses 146 and 148 are coupled to separate and distinct halves of the inner drum of the reel 140 (not shown). The drum halves of the reel 140 have rotatable seal mechanisms (not shown) which permit them to be coupled to intermediate water hoses 150 and 152 respectively extending from the sides of the reel 140. Thus the hoses 146 and 150 are coupled by one drum half and the hoses 148 and 152 are coupled by the other drum half. The intermediate hoses 150 and 152 are in turn coupled to the other sides of the on-off valves 128 and 130 respectively. Soapy water can be supplied through the supply hose 146 to the spray pipes 110 and 112 and rinse water can be supplied through the supply hose 148 to the spray pipe 114.

A flexible double hydraulic fluid hose 154 consisting of an input hose 156 and an output hose 158 joined side by side, is coiled about the reel 142. The innermost ends of the input and output hoses 156 and 158 are coupled to separate and distinct halves of the inner drum of the reel 142 (not shown). The drum halves of the reel 142 have rotatable seal mechanisms (not shown) which permit them to be coupled to intermediate hydraulic fluid hoses 160 and 162 respectively extending from the sides of the reel 142. The hoses 156 and 160 are coupled by one drum half and the hoses 158 and 162 are coupled by the other drum half. The intermediate hydraulic fluid hoses 160 and 162 are coupled to the hydraulic components of the wash dolly as will be described later on in greater detail.

As the wash dolly travels toward the closed end of the container, the reels 140 and 142 play out the double hoses 144 and 154. As the wash dolly travels back toward the transfer carriage, spring mechanisms (not shown) cause the reels 140 and 142 to rewind the double hoses 144 and 154.

Referring to FIGS. 2, 3 and 4, a front sensor mechanism 164 is positioned on the forward end of the wash dolly between the inner brush sections 66 and 68 and a rear sensor mechanism 166 is positioned on the rearward end of the wash dolly. A four-way flow reversing hydraulic valve 168 is secured to the A-frame 116 and the actuating lever thereof is operatively coupled to the front and rear sensing mechanisms 164 and 166.

The details of the front and rear sensing mechanisms 164 and 166 and the manner in which they are operatively coupled to flow reversing valve 168 are shown in FIG. 5. The valve 168 has a long depending actuating lever 170. The front and rear sensing mechanisms include front and rear bumpers 172 and 174 which are rigidly attached to rods 173 and 175. The rods 173 and 175 are rigidly attached to front and rear cylindrical sleeves 176 and 178. The sleeves fit over the ends of front and rear linkage rods 180 and 182 which are pivotably connected to the lever 170. Washers 184 and 186 are welded to the linkage rods 180 and 182 and springs 188 and 190 are positioned between the washers 184 and 186 and stops (not shown) inside of the sleeves 176 and 178. The rods 173 and 175 slide through holes in flanges 192 and 194 secured to the A-frame 116 and the chassis 22 respectively.

During the washing operation, the wash dolly travels toward the closed end of the container and eventually the brush 62 contacts the closed end. As the wash dolly continues to travel toward the closed end, the brush 62 is compressed and the front bumper 172 strikes the closed end. Thereafter, as the wash dolly continues to travel toward the closed end, the front bumper 172, the rod 173, and the front sleeve 176 slide rearwardly. This compresses the spring 188 and eventually moves the front linkage rod 180 rearwardly which in turn moves the lever 170. This shifts the flow reversing valve 168. At the same time, the rear linkage rod 182, the spring 190, the rear sleeve 178, the rod 175, and the rear bumper 174 slide rearwardly. The shifting of the valve 168 causes the flow of hydraulic fluid to the first hydraulic motor 36 to be reversed which in turn reverses the direction of rotation of the motor 36 and the support wheels 28 and 30 and the direction of travel of the wash dolly.

Referring to FIG. 1, as the wash dolly travels onto the support wagon of the transfer carriage after washing the interior of the container, the rear sensor bumper 174 eventually strikes a vertical stop 196 mounted on the support wagon. The rear bumper 174, the rod 175, and the rear sleeve 178 slide forwardly. This compresses the spring 190, and eventually moves the rear linkage rod 182 forwardly which in turn moves the lever 170 back to its original position. This shifts the flow reversing valve 168 back to its original state. At the same time the front linkage rod 180, the spring 188, the front sleeve 176, the rod 173, and the front bumper 172 slide forwardly back to their original positions.

The front and rear sensing mechanism 164 and 166 and the four-way valve 168 may be replaced, if desired, by a pressure sensing valve. This valve senses a rise in the hydraulic system pressure when the brush 62 strikes the closed end of the container and automatically reverses the flow of hydraulic fluid to the first hydraulic motor 36.

Figure 6:
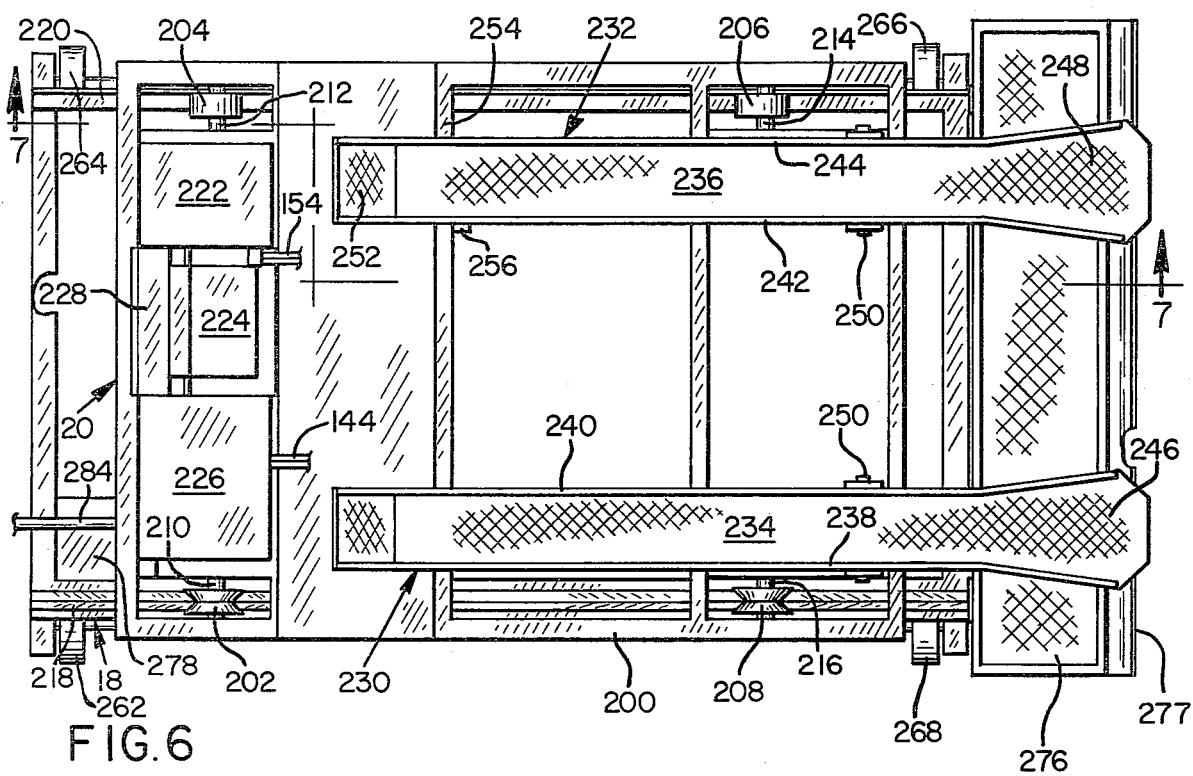
FIG. 6 is a top plan view of the transfer carriage of the apparatus of FIG. 1.
Figure 7:
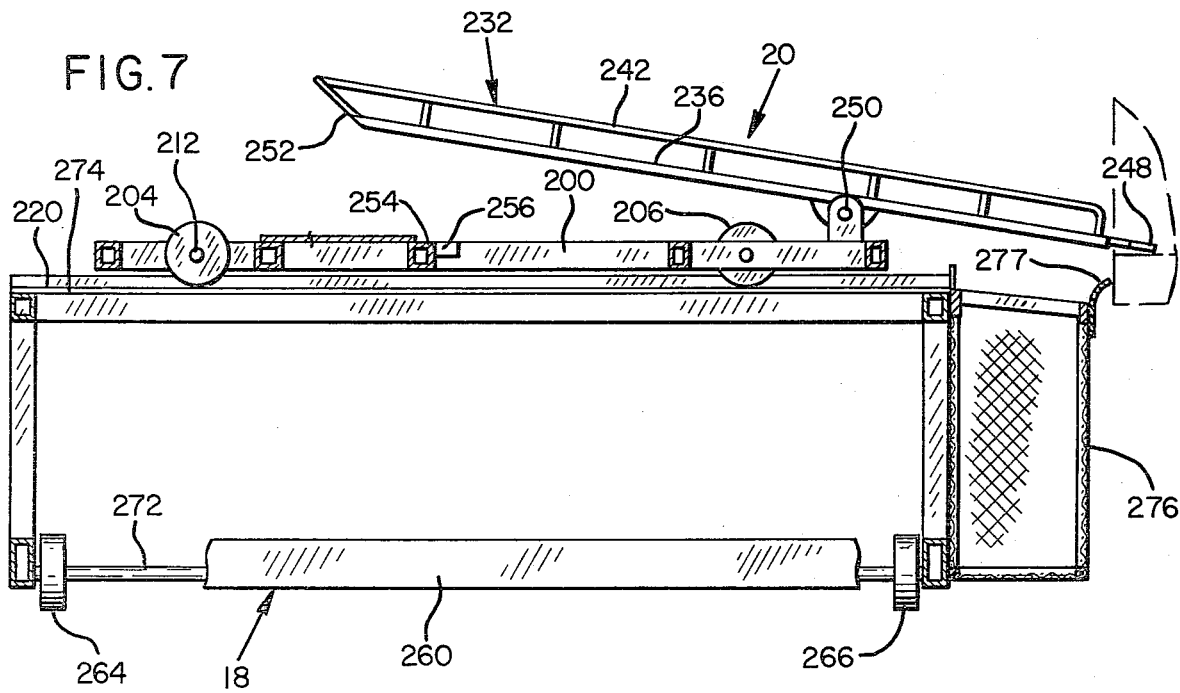
FIG. 7 is a sectional view of the transfer carriage of FIG. 6 taken along line 7—7 of FIG. 6.

Referring to FIGS. 1, 6 and 7, the supply wagon 20 includes a frame 200 having support wheels 202, 204, 206 and 208 and parallel axles 210, 212, 214 and 216 for rotatably mounting the support wheels to the frame. The support wheels are adapted to ride on a pair of rails 218 and 220 mounted on the top surface of the mobile platform 18. A hydraulic fluid tank and pump assembly 222, a detergent tank 224, a water tank and pump assembly 226, and a control panel assembly 228 are mounted on the rearward portion of the frame 200.

Many municipalities have ordinances which prohibit the direct coupling of industrial equipment to their water systems where there is a potential danger (however remote) that chemical pollutants such as detergent may be introduced back into the systems. Therefore the wash dolly of the present invention has a water tank which is periodically refilled.

A pair of spaced apart ramps 230 and 232 are mounted on the remaining portion of the frame 200 and are adapted to receive the support wheels 24, 26, 28 and 30 of the wash dolly. The ramps include planar screen sections 234 and 236 and vertically extending side guide rails 238, 240, 242 and 244. The forward portions 246 and 248 of the ramps 230 and 232 respectively are flared so that the wheels of the support dolly will be guided off of and onto the reremaining portions of the ramps.

The ramps 230 and 232 are pivotably mounted off-center so that as the wash dolly travels off of the support wagon the ramps will tilt and the forward portions 246 and 248 thereof will touch the bottom of the container thereby facilitating the guiding of the wash dolly into the container. As shown in FIG. 7, each ramp such as 232 is supported by a fulcrum assembly 250 which is positioned relative to the length of the ramp 232 so that the rearward end 252 thereof will rest on beam 254 when the wash dolly is supported on the ramps as shown in FIG. 1 and so that the ramps will tilt as previously described. A limit switch 256 is mounted on the beam 254 adjacent the end 252 of the ramp 232. The limit switch 256 has an arm (not shown) which is moved by the end 252 of the ramp 232. When the ramp 232 tilts forwardly as the wash dolly travels into the container, the limit switch 256 is closed.

Referring to FIGS. 1 and 6, the double water hose 144 is coupled to the pump of the water tank and pump assembly 226. Downstream from the water pump and not shown in the drawings is an infeed valve which introduces detergent from the detergent tank 224 into the supply hose 146 as a result of a Venturi effect when water is flowing through the hose 146. If desired, a chemical disinfectant may be introduced into the hose 146 in the same manner. The double hydraulic fluid hose 154 is coupled to the hydraulic fluid tank and pump assembly 222.

The supply wagon 20 can be manually rolled toward and away from the open end of the container and has a manual brake (not shown) for fixing the position of the supply wagon on the rails 218 and 220. Preferably when the mobile platform 18 is in position adjacent the open end of the container, the supply wagon can be moved rearwardly on the rails 218 and 220 far enough so that the forward portions 246 and 248 of the ramps 230 and 232 will clear the sides of the container when the mobile platform is pushed in a lateral or transverse direction to an adjacent, parallel freight container.

Referring to FIGS. 1 and 7, the mobile platform 18 includes a box-like frame 260 having support wheels 262, 264, 266 and 268 and a pair of parallel axles 270 and 272 for rotatably mounting the support wheels to the frame. The axles 270 and 272 of the mobile platform are perpendicular to the axles 210, 212, 214 and 216 of the supply wagon 20. The frame 260 has a top surface 274 upon which the rails 218 and 220 are mounted and a receptacle 276 made of screen material for catching debris swept out of the container. A transversely extending flap 277 attached to the receptacle 276 butts up against the rear end of the container 16 and effects a temporary seal so that water and debris swept from the container are strained through the receptacle. Preferably the frame 260 is tall enough so that the wash dolly carried by the supply wagon supported on top of the mobile platform can readily enter the open end of a standard truck trailer. The mobile platform can be designed to be raised and lowered to accommodate freight containers which are positioned at different heights above the ground.

Supported on the frame 260 beneath the surface 274 is a hydraulic fluid tank and pump assembly 278 for supplying hydraulic fluid through hoses 279 to a third hydraulic motor 280 which is drivingly interconnected with wheels 262 and 268 through a third sprocket and chain assembly 282. A water supply line 284 for the water tank of the assembly 226 and an electric supply line 286 for the pumps of the assemblies 222, 226 and 278 are carried by a boom assembly 290 on the frame 260 and are coupled to overhead water and electrical outlets not shown. The supply wagon and the wash dolly are carried into alignment with the open end of the container by the mobile platform which can travel transversely between a number of different wash stations.

Figure 8:
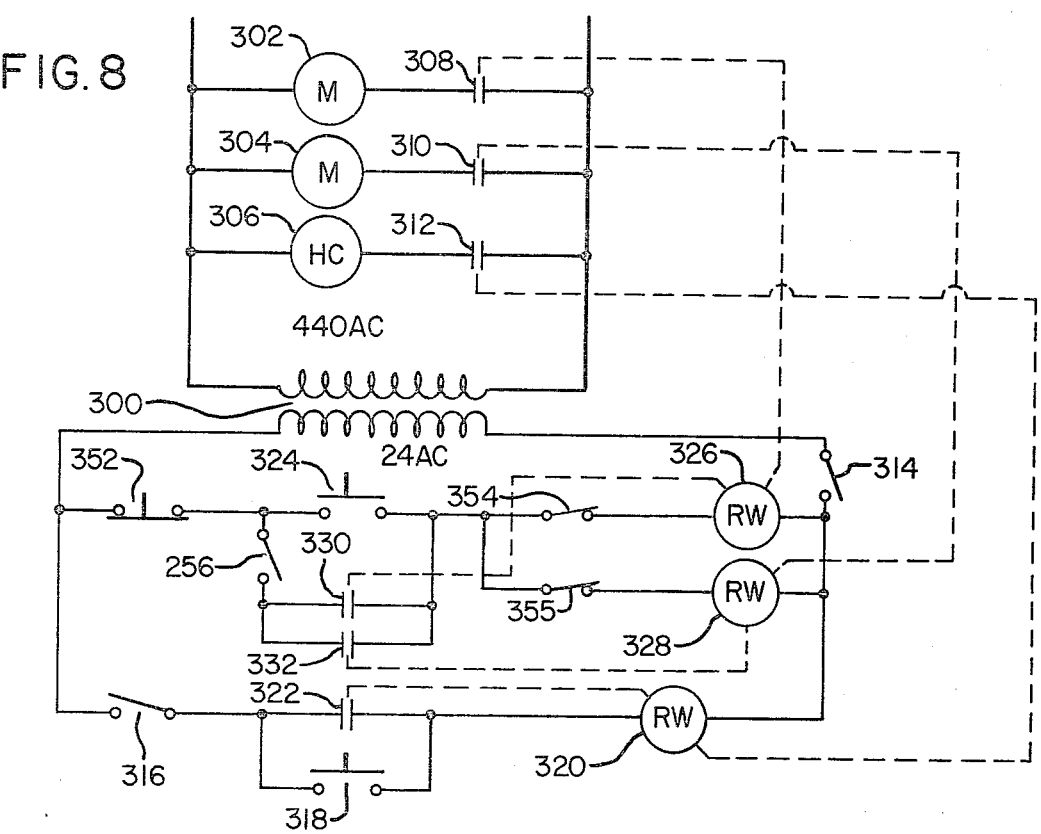
FIG. 8 is a schematic diagram of the electrical circuit forming a part of the control system of the apparatus of FIG. 1.
Figure 9:
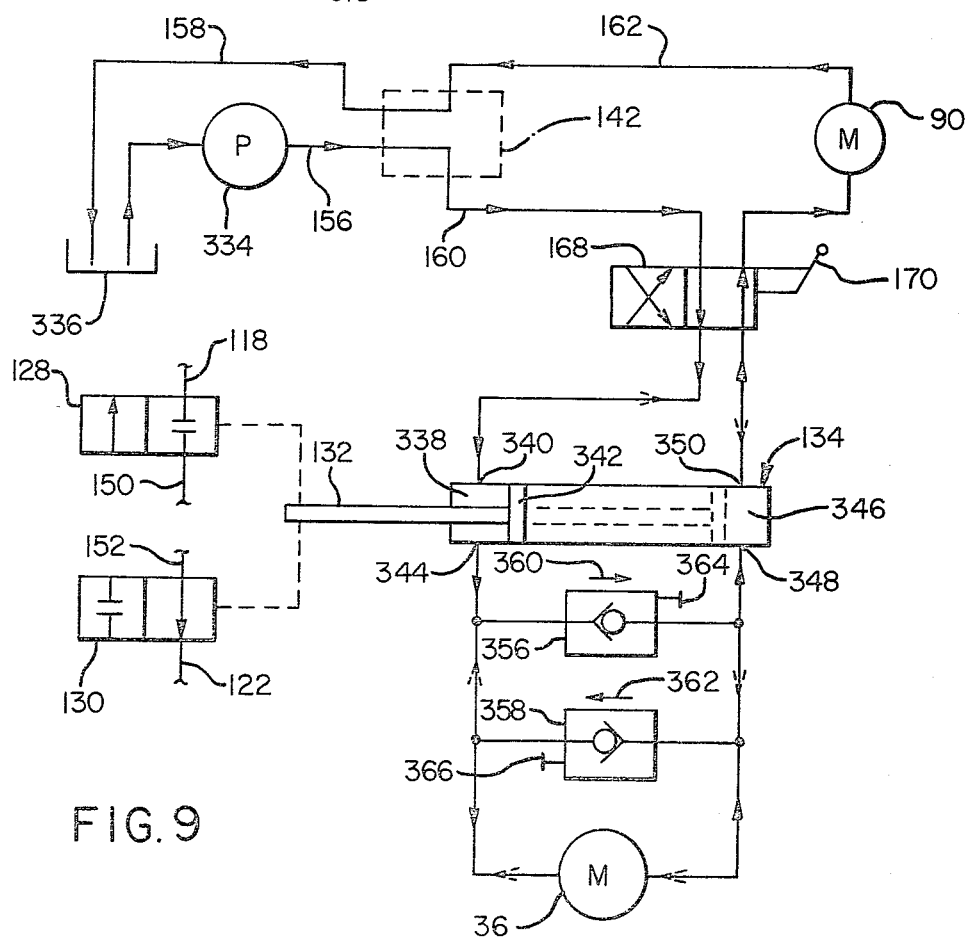
FIG. 9 is a schematic diagram of the hydraulic circuit forming a part of the control system of the apparatus of FIG. 1.

The operation of the apparatus described above and shown in FIGS. 1-7 will now be set forth in conjunction with an explanation of its control system which includes electrical and hydraulic control circuits, preferred embodiments of which are shown in FIGS. 8 and 9. The hydraulic fluid tank and pump assembly 278 which drives the third hydraulic motor 280 and propels the mobile platform 18 is controlled by a separate standard circuit which is not described herein.

Referring to FIG. 8, 440 volts AC supplied by the overhead electrical outlet is connected across one side of a transformer 300 which steps the voltage down to 24 volts AC. Three-phase induction motors 302 and 304 which drive the hydraulic fluid and water pumps of assemblies 222 and 226 respectively, and a heater coil 306 mounted inside the water tank of assembly 226, are connected across the 440 volts AC through relay contacts 308, 310 and 312 respectively.

One side of a low-water limit switch 314 which is mounted in the water tank of the assembly 226 is connected to the other side of the transformer 300. The switch 314 is normally open but is closed when a predetermined minimum level of water is in the water tank. This prevents operation of the apparatus when there is insufficient water in the tank for a complete washing operation. If the tank is completely emptied during the washing operation, the pump of the assembly 226 may be damaged.

With the exception of the switches 256 and 314, the electrical switches hereafter referred to are mounted in the control panel assembly 228. When the low-water limit switch 314 is closed, a heater switch 316 is manually closed and a momentary switch 318 is depressed causing relay winding 320 to be energized which in turn closes relay contacts 312 and 322. The heater coil 306 is energized to heat the water to a temperature suitable for the washing operation. A thermostat (not shown) may be used to regulate the water temperature.

After the water has been heated to the desired temperature a momentary starter switch 324 is depressed (and held closed) causing relay windings 326 and 328 to be energized. Relay contacts 308 and 330 associated with the relay winding 326 and relay contacts 310 and 332 associated with the relay winding 328 are closed. The electrical motors 302 and 304 are energized and drive the hydraulic fluid and water pumps of the assemblies 222 and 226 respectively.

Referring to FIG. 9, the hydraulic fluid pump 334 of the assembly 222 pumps hydraulic fluid from the hydraulic fluid tank 336 at approximately 600 PSI through the input hose 156, through the reel 142, through the intermediate hydraulic fluid hose 160 and into the four-way flow reversing valve 168. Hydraulic fluid from the valve 168 flows through a hose (not shown in FIGS. 1-7) in the direction indicated by the solid arrows into one end 338 of the hydraulic cylinder 134 through a first port 340. At this time, the piston 342 and the piston arm 132 of the hydraulic cylinder 134 are fully extended and the on-off valves 128 and 130 to which the piston arm 132 is operatively coupled are in their closed and open states respectively. When the end 338 of the hydraulic cylinder 134 is full of hydraulic fluid, but prior to any movement of the piston 342, hydraulic fluid flows from the hydraulic cylinder through a second port 344 and through a hose (not shown in FIGS. 1-7) to the first hydraulic motor 36.

The hydraulic fluid encounters substantially less resistance in moving the piston 342 and the piston arm 132 of the hydraulic cylinder than it would encounter in flowing through the hydraulic motor 36. Less than 50 PSI is needed to move the piston 342 of the hydraulic cylinder 134 whereas the hydraulic motor requires at least several hundred PSI to operate. Therefore, the hydraulic fluid does not flow through the hydraulic motor 36 in substantial quantities at this time but instead continues to flow into the end 338 of the hydraulic cylinder, gradually moving the piston 342 and the piston arm 132 to their fully retracted positions shown in phantom lines. This takes approximately four to five seconds. The retraction of the piston arm 132 shifts the on-off valves 128 and 130 to their open and closed states respectively so that soapy water is discharged from the spray pipes 110 and 112 and no water is discharged from the spray pipe 114.

After the piston 342 and the piston arm 132 are fully retracted, hydraulic fluid flows through the first hydraulic motor 36 which in turn drives the support wheels 28 and 30 of the wash dolly in a direction so that the wash dolly begins to travel off of the supply wagon 20 toward the open end of the container. It should be noted that there is a slight delay of several seconds after the starter switch 324 is depressed before the wash dolly begins to travel off of the supply wagon. This delay allows the water hoses and spray pipes to be "charged", i.e. filled. Soapy water is discharged as the wash dolly enters the container. This insures thorough cleaning of the container.

Hydraulic fluid flows from the hydraulic motor 36 through a hose (not shown in FIGS. 1–7) and into the other end 346 of the hydraulic cylinder 134 through a third port 348. The hydraulic fluid pressure inside of the hydraulic cylinder 134 at the end 346 is substantially less than that at the end 338 so that the piston 342 and the piston arm 134 do not move at this time. Hydraulic fluid flows from the hydraulic cylinder 134 through a fourth port 350 and through a hose (not shown in FIGS. 1–7) to the valve 168. It then flows from the valve 168 through another hose (not shown in FIGS. 1–7) to the second hydraulic motor 90. Thereafter it flows through the hydraulic motor 90 which rotates the brush 62 on the forward end of the wash dolly in a clockwise direction (See FIG. 4). Finally, the hydraulic fluid flows from the second hydraulic motor 90 through the intermediate hydraulic fluid hose 162, through the reel 142, through the output hose 158 and back into the tank 336 of the assembly 222.

As the wash dolly travels off of the supply wagon 20, the ramps 230 and 232 tilt and their forward portions 246 and 248 contact the bottom of the container. This causes the limit switch 256 to close at which point the momentary starter switch 324 can be released and the apparatus will be "locked into" its washing operation.

During the washing operation, the wash dolly travels toward the closed end of the container, scrubbing and spraying as it moves along. Eventually the brush 62 is compressed against the closed end of the container and the front bumper 172 of the front sensor mechanisms 164 strikes the closed end and is moved rearwardly. The lever 170 is moved which shifts the valve 168. Hydraulic fluid from the valve 168 now flows (in the direction indicated by the dotted arrows) into the end 346 of the hydraulic cylinder 34 through the fourth port 350. The piston 342 and the piston arm 132 are gradually moved to their extended positions, causing the on-off valves 128 and 130 to be shifted to their closed and open states respectively. This terminates the delivery of soapy water through the spray pipes 110 and 112 and commences the delivery of clean water through the spray pipe 114. It takes approximately four to five seconds until enough hydraulic fluid has entered the hydraulic cylinder 134 so that the piston 342 and the piston arm 132 have been moved to their fully extended positions. During this delay, the hydraulic motor 36 is not being powered and the wash dolly momentarily stops at the closed end of the container. However, the brush 62 is continuously rotated.

When the piston 342 and the piston arm 132 have reached their extended positions, hydraulic fluid flows through the first hydraulic motor 36 and back into the end 338 of the hydraulic cylinder through the second port 344. The first hydraulic motor is powered so that it drives the support wheels 28 and 30 of the wash dolly in a direction opposite to their original direction of rotation. This causes the wash dolly to travel toward the transfer carriage and away from the closed end of the container. The wash dolly travels onto the ramps 230 and 232 of the supply wagon 20 until eventually the ramps tilt back to their original horizontal positions.

Referring again to FIG. 8, when the ramps tilt back to their original positions, the limit switch 256 is opened, de-energizing the relay windings 326 and 328, opening the relay contacts 308, 310, 330 and 332 and de-energizing the electric motors 302 and 304. The hydraulic fluid and water pumps cease delivering hydraulic fluid and water respectively and the wash dolly stops traveling and discharging water. Before the wash dolly has completed traveling back onto the support wagon 20, the rear bumper 174 of the rear sensor mechanism 166 strikes the vertical stop 196 mounted on the support wagon. This slides the rear bumper 174 forwardly, moving the lever 170 back to its original position and shifting the flow reversing valve 168 back to its original state.

A normally closed momentary switch 352 can be manually depressed and opened to shut down the apparatus in case of an emergency. Switches 354 and 355 may be manually operated to select one of three different modes of operation. When both the switches 354 and 355 are closed as shown, the apparatus can be operated as previously described. The switch 355 can be opened so that the wash dolly will travel and scrub but will not spray. Alternatively, the switch 355 can be closed and the switch 354 can be opened, so that the wash dolly will spray but will not travel or scrub.

Referring again to FIG. 9, bleed valves 356 and 358 may be incorporated into the hydraulic circuit if desired. They are coupled across the hoses leading directly to the hydraulic motor 36. Hydraulic fluid can flow through the check valves 356 and 358 only in the directions indicated by arrows 360 and 362 respectively. The rate of flow through the check valves 356 and 358 can be manually adjusted by turning screw handles 364 and 366 respectively.

When hydraulic fluid is flowing the direction indicated by the solid arrows, a portion of the fluid flowing out of the end 338 of the hydraulic cylinder 134 can be bypassed through the check valve 356 and into the end 346 of the hydraulic cylinder. This reduces the pressure and quantity of hydraulic fluid flowing through the hydraulic motor 36 and thus reduces the speed at which the wash dolly travels toward the closed end of the container. When hydraulic fluid is flowing in the direction indicated by the dotted arrows, a portion of the fluid flowing out of the end 346 of the hydraulic cylinder 134 can be bypassed through the check valve 358 and into the end 338 of the hydraulic cylinder. This reduces the pressure and quantity of hydraulic fluid flowing through the hydraulic motor 36 and thus reduces the speed at which the wash dolly travel back toward the transfer carriage.

The check valves 356 and 358 can be independently adjusted to vary the speeds at which the wash dolly travels into and out of the container. Generally, it is desirable to have the wash dolly travel into the container relatively slowly so that the soapy water scrubbing is thorough. The wash dolly can travel out of the container at a higher speed since it is merely rinsing and sweeping debris and water out of the container.

EMBODIMENT OF FIG. 10

An apparatus forming a second embodiment of the present invention includes a transfer carriage 400 adapted to carry a wash dolly 402. During the washing operation, the wash dolly is propelled off of the transfer carriage and into the interior of an elongate, generally rectangular freight container such as a truck trailer 406 (shown in phantom lines).

The wash dolly 402 includes a chassis 408 having rotatable brush 410 and a spray pipe assembly 412 mounted on its forward end. Mounted on the rearward end of the chassis 408 are a pair of rotatable reels 414 and 416 around which are coiled a double hydraulic fluid hose 418 and a double water supply hose 420. The support wheels of the wash dolly are surrounded by guide means in the form of fenders 422 and 424 which can engage the sides of the container to maintain the chassis 408 and its support wheels in proper orientation for longitudinal travel along substantially the entire length of the container.

A front sensor mechanism 426 is mounted on the forward end of the wash dolly. Also mounted on the chassis 408 but not shown in the drawings are hydraulic motors and drive mechanisms for rotating the support wheels and the brush 410. The hydraulic motors are coupled to the double hydraulic fluid hose 418 and the spray pipe assembly is coupled to the water supply hose 420.

The transfer carriage 400 differs from the transfer carriage 12 of the previously described embodiment in that the former does not have a separate supply wagon. The transfer carriage 400 includes a box-like frame 428 having support wheels which are driven by a hydraulic motor 430. A receptacle 432 made of a screen material is mounted to the frame 428 in a position for catching debris swept from the interior of the container 406. Mounted on the lower level of the frame 428 is a hydraulic fluid tank and pump assembly 434 and a water tank and pump assembly 436 which are coupled to hoses 418 and 420 respectively. The hydraulic motor 430 is coupled to the hydraulic fluid tank and pump assembly 434 through hose 438.

The upper level of the frame 428 has a pair of spaced apart ramps 440 and 442 which are adapted to receive the support wheels of the wash dolly 402. The ramps 440 and 442 have vertically extending retaining walls which prevent the support wheels of the wash dolly from traveling off of the ramps. Chutes 444 and 446 are attached to the forward ends of the ramps 440 and 442 respectively by hinge mechanism 448 and 450 and are adapted to swing downwardly into contact with the bottom of the container to permit the wash dolly to travel between the transfer carriage and the container.

An overhead electrical hot line 452 and ground line 454 are connected to the hydraulic fluid and water pumps of the assemblies 434 and 436 respectively through a traveling boom assembly 456 mounted to the frame 428. An overhead water outlet 458 hung from an overhead support cable 460 is connected to the water pump of assembly 436 through the boom assembly 456. When the wash dolly is supported on the transfer carriage, the transfer carriage can be propelled in a transverse direction by the hydraulic motor 430 to a plurality of different wash stations for washing the interiors of a plurality of truck trailers parked side by side. The boom assembly 456 slides along the overhead cable 460 and continuous electrical and water connections are maintained.

Trailer wheel guides such as 462 may be installed at the different stations to facilitate alignment of truck trailers. The apparatus of FIG. 10 has a control system including electrical and hydraulic circuits similar to those previously described so that the wash dolly performs a similar washing operation.

EMBODIMENT OF FIG. 11

Figure 10:
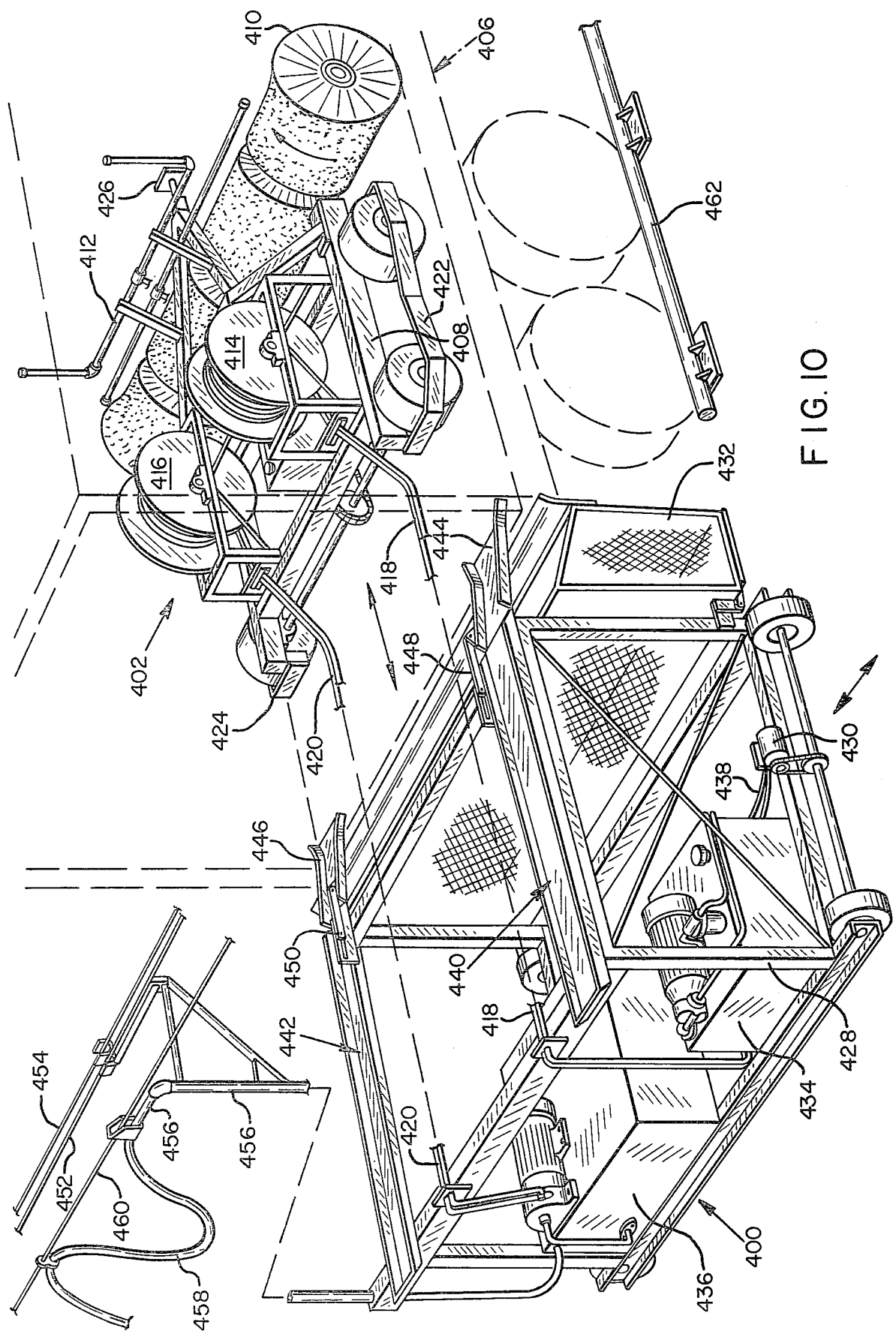
FIG. 10 is a perspective view of an apparatus forming a second embodiment of the present invention.
Figure 11:
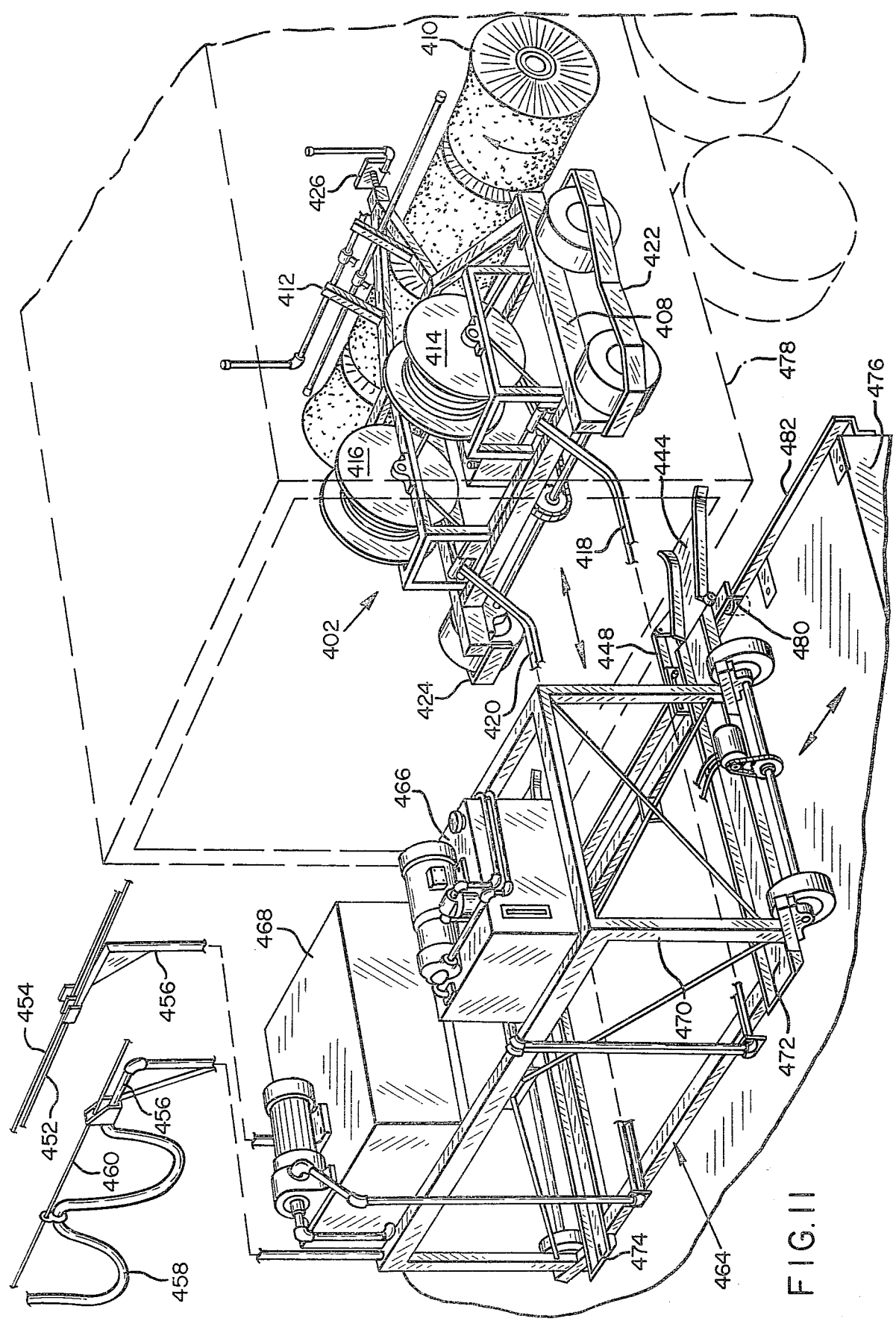
FIG. 11 is a perspective view of an apparatus forming a third embodiment of the present invention.

An apparatus forming a third embodiment of the present invention uses the same wash dolly 402 as the apparatus of FIG. 10. The transfer carriage 464 is similar to the transfer carriage 400 of the apparatus of FIG. 10 except that the former has its hydraulic fluid tank and pump assembly 466 and water tank and pump assembly 468 mounted on the upper level of its box-like frame 470 and its ramp assemblies 472 and 474 mounted on the lower level of the frame. The wash dolly is supported on the transfer carriage below the asemblies 466 and 468.

The transfer carriage 464 is designed to travel transversely on a raised dock 476, the height of which is substantially the same as that of the bottom of an adjacent truck trailer 478. The frame 470 has guide rollers such as 480 mounted thereto which are adapted to ride in a track or rail 482 secured to the edge of the dock 476. The transfer carriage can thus be directed transversely along the dock 474 to a plurality of different wash stations.

It is apparent that adaptations and modifications of the present invention will occur to those skilled in the art. For example, the wash dolly can travel into and out of the freight container off of a wide variety of support bases. A permanent raised dock can serve as a support base, without using a transfer carriage. The wash dolly can travel from the interior of one freight container directly into the interior of another freight container. It can have a variety of brush and spray mechanisms. The control system can be modified to vary the washing operation, for example, it may be desirable to have the wash dolly travel back and forth inside the container a number of times and to vary the scrubbing and spraying sequences. However, such modifications and adaptations are within the spirit and scope of the present invention.

What is claimed is:

1. In an apparatus for washing the interior of an elongate, generally rectangular freight container having a bottom, a pair of sides, an open end, and a closed end,
    a wash dolly having a chassis, a plurality of first support wheels, means for rotatably mounting the first support wheels to the chassis, first drive means for rotating at least one of the first support wheels, brush means for scrubbing at least the bottom of the container, second drive means for moving the brush means, spray means for discharging water adjacent the brush means, and guide means for engaging the sides of the container and maintaining the chassis and the first support wheels in proper orientation for longitudinal travel along substantially the entire length of the container;
    a supply wagon having a first frame, a plurality of second support wheels, means for rotatably mounting the second support wheels to the first frame, ramp means adapted to receive and support the wash dolly and guide the wash dolly between the supply wagon and the interior of the container, means for supplying water under pressure to the spray means, and means for supplying power to the first and second drive means;
    a mobile platform having a second frame, a plurality of third support wheels, means for rotatably mounting the third support wheels to the second frame, third drive means for rotating at least one of the third support wheels, means adapted to receive and support the supply wagon and guide the supply wagon to and away from the open end of the container, means mounted on the second frame for supplying power to the third drive means; and control means for causing the wash dolly to travel off of the supply wagon, into the open end of the container, along substantially the entire length of the container, and then back onto the supply wagon, and for further causing the brush means to move and the spray means to discharge water.

2. A wash dolly adapted to travel into the open end of an elongate freight container, along the bottom of the container to its closed end, and then back out of the container through its open end, while scrubbing and spraying the interior of the container, comprising:
- a wheeled chassis adapted to travel longitudinally inside the container along the bottom thereof;
- hydraulic motor drive means for propelling the chassis longitudinally back and forth inside the container, the drive means being reversible and requiring hydraulic fluid at a pressure greater than a predetermined minimum pressure in order to propel the chassis;
- brush means mounted on the chassis for scrubbing the bottom of the container;
- spray means mounted on the chassis for discharging water;
- a source of hydraulic fluid at a pressure greater than the predetermined minimum pressure;
- a flow reversing hydraulic valve;
- a hydraulic cylinder having an internal piston movable between the ends of the cylinder by hydraulic fluid at a pressure substantially less than the predetermined minimum amount;
- sensing means for shifting the hydraulic valve when the wash dolly reaches the closed end of the container; and
- means for hydraulically interconnecting the hydraulic valve and the hydraulic cylinder between the source of hydraulic fluid and the hydraulic motor drive means so that when the chassis arrives at the closed end of the container the hydraulic valve will shift and the chassis will momentarily stop its travel while the piston of the hydraulic cylinder moves from one of its ends to its other end after which the chassis will travel back out of the container.

3. The wash dolly of claim 2 and further comprising:
- second hydraulic motor drive means for moving the brush means;
- means for hydraulically interconnecting the second hydraulic motor drive means with the source of hydraulic fluid so that the brush means is continually moved when the chassis travels inside the container and also when it momentarily stops at the closed end thereof.

4. A wash dolly according to claim 2 and further comprising means for independently adjusting the quantity of hydraulic fluid supplied to the hydraulic motor drive means for independently controlling the speeds at which the wash dolly travels into and out of the container.

5. The wash dolly of claim 2 and further comprising:
- a source of water at a predetermined pressure level;
- first and second hose means for independently connecting the source of pressurized water to the spray means;
- a pair of on-off valves, each operatively coupled intermediate one of the first and second hose means, the on-off valves having adjacent actuating levers which when simultaneously moved in the same direction cause a first one of the on-off valves to close and a second one of the on-off valves to open;
- a piston arm connected to the piston of the hydraulic cylinder;
- means for operatively coupling the piston arm to the actuating levers of the on-off valves so that when the piston arm is fully extended the one on-off valve will be open and the second on-off valve will be closed, and when the piston arm is fully retracted the one on-off valve will be closed and the second on-off valve will be open; and
- means for injecting detergent into one of the hose means so that as the chassis travels toward the closed end of the container water and detergent will be discharged from the spray means and when the chassis momentarily stops at the closed end of the container the hydraulic cylinder will shift the on-off valves so that thereafter as the chassis travels back toward the open end of the freight container water without detergent will be discharged from the spray means.

6. A wash dolly for washing the interior of an elongate freight container having a bottom and a pair of sides, comprising:
- a wheeled chassis adapted to travel longitudinally inside the container along the bottom thereof;
- drive means for propelling the chassis;
- brush means for scrubbing the bottom of the container;
- means for pivotably mounting the brush means on the chassis for swinging movement toward and away from the bottom of the container; and
- spray means mounted on the chassis for discharging water,
- the brush means including a transversely extending cylindrical brush having a plurality of bristles arranged into opposite axially extending spiral configurations on opposite, axially spaced half sections of the brush,
- the brush being designed to extend substantially the full width of the interior of the container,
- the brush means also including means for rotating the brush so that liquid and debris on the bottom of the container are urged toward a line extending longitudinally along the bottom, midway between the sides of the container.

* * * * *